April 15, 1958  J. B. PARSONS  2,830,859
AIR BLEEDING PISTON
Filed Jan. 24, 1955
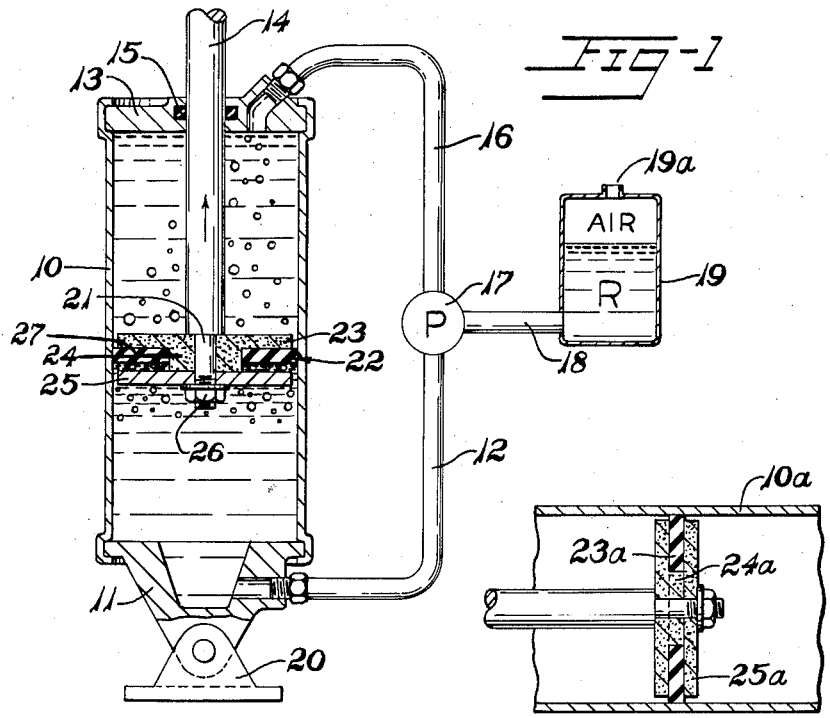
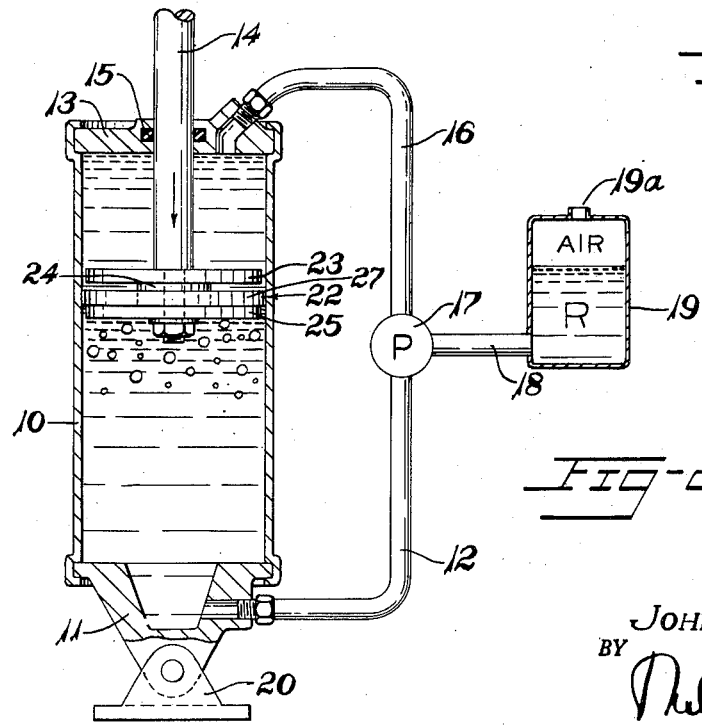
INVENTOR.
JOHN B. PARSONS
BY
ATTY.

United States Patent Office 2,830,859
Patented Apr. 15, 1958

2,830,859

AIR BLEEDING PISTON

John B. Parsons, Maumee, Ohio

Application January 24, 1955, Serial No. 483,769

2 Claims. (Cl. 309—4)

This invention relates to hydraulic piston and cylinder assemblies, but particularly of the type embodying cylinders closed at both ends to which liquid under pressure is recurrently forced.

An object is to bleed air entrapped in the liquid from one side of the piston to the other.

Another object is to produce a piston which is so constructed that when it imposes force on a liquid in which air is entrapped, the air will bleed through the piston to the opposite side from which it can pass to the outside of the cylinder.

A further object is to produce a new and improved hydraulic piston assembly having a part of air permeable powdered metal through which air may be bled when the piston is actuated in one or both directions, depending upon the associated piston structure.

A still further object is to produce in a closed hydraulic system including a piston and cylinder assembly wherein liquid under pressure is introduced alternately into one end or the other of the cylinder for actuating the piston, a device for bleeding liquid entrapped air through the piston so that it may be vented to the outside.

Other objects reside in details of construction, arrangement and operation and for purposes of illustration but not of limitation, an embodiment of the invention is shown in the accompanying drawings in which:

Figure 1 is a longitudinal sectional elevation of a hydraulic piston and cylinder assembly and showing opposite ends of the cylinder connected to a pump which in turn is connected to a reservoir;

Figure 2 is a view similar to Figure 1, but showing the piston moving in the opposite direction; and Figure 3 is a fragmentary longitudinal sectional view of an alternate form.

The illustrated embodiment of the invention comprises an elongate cylinder 10, one end of which is closed by a fitting 11 to which is connected a tube 12 providing a means for ingress and egress of liquid with respect to the inside of the cylinder. The fitting 11 is pivoted to a stationary bracket 20 to enable the cylinder to rock during the piston movement. The opposite end of the cylinder is closed by a disc 13 which is centrally apertured to receive a piston rod 14, suitable packing 15 being provided in the closure disc for the piston rod. Leading from the disc 13 is a tube 16 and both tubes 12 and 16 lead to a suitable reversible hydraulic pump 17, which is connected by a tube 18 to a liquid reservoir 19. One example of such a pump is shown in my prior Patent No. 2,622,529 of December 23, 1952. The reservoir may be sealed or have a suitable air vent 19a. Piston and cylinder arrangements of this type have general utility for driving one or both of two relatively movable members respectively connected to bracket 20 and piston rod 14. The invention is concerned with the removal of air from the liquid which drives the piston.

The inner end of the piston rod is reduced as indicated at 21 and bearing against the shoulder so formed is a piston assembly indicated generally at 22. The piston assembly comprises a main circular body 23 of slightly less diameter than the inside diameter of the cylinder, and the body 23 has an integral centrally disposed axially extending cylindrical boss 24 of reduced diameter. The main body with its boss 24 is formed of powdered metal, such as iron, suitably compressed and sintered to produce a self-sustaining form. A satisfactory process for producing powdered metal bodies is set forth in Patent 2,695,231 dated November 23, 1954. The body thus formed is such that when liquid containing air bubbles creating an emulsion is forced against the body, the air in the emulsion can bleed through interstices in the body from one side to the other. Instead of powdered metal, other minutely foraminous materials may be used, such as aluminum, cast iron or ceramics, provided they have the desired bleeding characteristics. Such characteristics may be achieved in the main in the fabrication process of such materials by controlling the density of the material.

Abutting against the end of the boss 24 is a non-porous or non-permeable metallic washer or disc 25 also of slightly less diameter than the inside diameter of the cylinder, a nut 26 on the reduced end portion 21 of the piston rod holding the washer flatly and tightly against the piston rod shoulder. Between the disc-like portion 23 of the main body and the disc 25 and having a fluid sealing and sliding engagement with the inner walls of the cylinder 10 is a rubber disc 27. The disc 27 closely fits and slides along the cylinder walls and prevents the passage of liquid from one side of the piston to the other. The extent of sliding movement of the rubber disc is determined by the axial dimension of the boss 24 and as shown, the disc 27 is a little over one-half the thickness of the boss 24 in an axial direction, so that the disc has very slight axial movement.

Upon the liquid under pressure forcing the piston assembly 22 upwardly in the cylinder, as indicated in Figure 1, the rubber disc 27 slides along the boss 24 until it abuts flatly against the inner face of the disclike portion 23 of the body. This provides a space in the lower portion of the boss 24 between the rubber disc 27 and the metallic disc 25 which is air permeable and through which air may bleed through the body to the space above the piston. If there is considerable air trapped in the liquid, it may require several reciprocatory movements of the piston to bleed all of it through the piston body to the portion of the cylinder about the piston. Such bleeding is caused by the pressure generated by the pressure generated by the liquid against the piston assembly, placing the entrapped air therein under pressure and causing it then to bleed through the permeable portion of the piston assembly.

Manifestly, when the piston is forced by liquid pressure downwardly in the cylinder, the washer or disc 25 rides downwardly to abut flatly against the non-porous disc 25 and thereby prevents any bleeding of air through the piston body inasmuch as no portion of the permeable piston is exposed to the liquid against which pressure is exerted. It is only on the upward piston movement when the air, trapped in the liquid due to the churning action of the piston, is forced to bleed through the piston body. An insignificant amount of liquid may seep through the piston body, but this is so small as to be inconsequential.

Thus in operation of the closed hydraulic system, the pump 17 draws liquid through the tube 16 from the upper side of the piston and forces it through the tube 12 into the lower side of the cylinder, creating liquid pressure to force the piston assembly 22 upwardly. Any deficiency of liquid is made up by drawing from the reservoir 19. In so doing, the rubber sealing disc 27 is forced upwardly against the under side of the disc-like body 23, uncovering a portion of the permeable boss 24, through which the air trapped in the liquid passes to the upper side of the piston.

The air in the upper side of the piston passing along with the liquid in emulsion-like condition, during repeated reciprocatory piston movements, finds its way into the reservoir 19 where it rises to the top, from which it may be readily vented. The unequal areas on the two sides of the piston caused by the presence of the piston rod 14 results that in one direction of movement of the piston, a greater volume of liquid is forced into the cylinder 10 than in the opposite direction, so that as a result, there is a recurrent flow of liquid to and from the reservoir 19, through the pump 17. Liquid containing the air thus in time finds its way into the reservoir where the air rises to the top where it may be vented to the outside or contained in the reservoir above the liquid. The bleeding of air through the walls of the piston body enables the air to be delivered to the side of the piston containing the piston rod and thus having the smaller area, and in view of the liquid movement to and from the reservoir relative to this portion of the cylinder, the liquid entrapped air passes to the reservoir. The liquid in the lower part of the cylinder will thus in due time be free of air bubbles.

The form shown in Figure 3 is similar to that above described except that the disc or washer 25a is also of the same or similar material as the piston body 23a and boss 24a, so that all of these members are of air permeable material. This structure is advantageous when the cylinder 10a is horizontally disposed so that the air bubbles can bleed in either direction, finally reaching the reservoir from which air is vented. Consequently, only the liquid remains in the system and the objections and difficulties resulting from air in the system are automatically obviated.

It is to be understood that numerous changes in structure and choice of material may be made without departing from the spirit of the invention, especially as defined in the appended claims.

What I claim is:

1. A piston and cylinder assembly for hydraulic fluid actuated devices comprising a cylinder, a piston adapted to reciprocate axially in the cylinder, said piston having an end surface and a central boss having a free end extending axially from the end surface, said boss and said piston being substantially impervious to hydraulic fluid material and having minute interstices therein permitting air to bleed through the boss and from one side of the piston to the other, an abutment of hydraulic fluid and air impervious material on the free end of said boss, said abutment extending radially outward from the boss and having a surface facing the piston, there being a space between the abutment and said end surface of the piston, and a hydraulic fluid and air impervious sealing disc having a central opening surrounding said boss and having an outer periphery sealingly engaging said cylinder, said sealing disc having a surface facing said abutment adapted to sealingly engage the same and being of less thickness than the space between said abutment and said end surface of said piston, said sealing disc having limited movement in said space between said end surface of the piston and said abutment, whereby upon relative movement between said disc and piston in one direction, said disc engages said abutment and thereby substantially blocks the passage of air normally flowing around said abutment from the adjacent side of said cylinder to said boss and, upon said relative movement in the opposite direction, a gap is opened between said disc and said abutment and disc and air is permitted to flow therearound to said boss.

2. A piston and cylinder assembly for hydraulic fluid actuated devices comprising a cylinder adapted to be disposed vertically, a piston adapted to reciprocate vertically in the cylinder, a central boss on the lower side of the piston, said boss and said piston being substantially impervious to hydraulic fluid material and having minute interstices therein permitting air to bleed through the boss and from one side of the piston to the other, an abutment of hydraulic fluid and air impervious material on the lower end of said boss, said abutment extending radially outward from the boss and having an upper surface facing the piston, there being a space between said abutment and the lower end of the piston, and a hydraulic fluid and air impervious sealing disc slidably engaged around said boss and having an outer periphery sealingly engaging said cylinder, said sealing disc having a surface facing said abutment adapted to sealingly engage the same and being of less thickness than the space between the abutment and the lower end of the piston, said sealing disc having limited movement in said space between said piston and abutment, whereby, upon relative movement between said disc and piston in one direction, said disc engages said abutment and thereby substantially blocks the passage of air normally flowing around said abutment from the lower side of said cylinder to said boss and, upon said relative movement in the opposite direction, a gap is opened between said disc and said abutment and disc and air is permitted to flow therearound to said boss.

References Cited in the file of this patent

UNITED STATES PATENTS

| | | |
|---|---|---|
| 1,278,030 | Schmitt | Sept. 3, 1918 |
| 1,994,974 | Weidmann | Mar. 19, 1935 |
| 2,635,715 | Riedel et al. | Apr. 21, 1953 |
| 2,676,613 | Baxter | Apr. 27, 1954 |
| 2,695,778 | Mercier et al. | Nov. 30, 1954 |
| 2,702,398 | Marcus | Feb. 22, 1955 |